United States Patent
Watanabe et al.

(10) Patent No.: US 9,377,627 B2
(45) Date of Patent: Jun. 28, 2016

(54) HEAD-MOUNTABLE DISPLAY DEVICE WITH PIVOTING CIRCUIT SUPPORT

(71) Applicant: Brother Kogyo Kabushiki Kaisha, Nagoya-shi, Aichi-ken (JP)

(72) Inventors: Mitsuyoshi Watanabe, Hashima (JP); Norimi Yasue, Nagoya (JP); Masanori Oda, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 277 days.

(21) Appl. No.: 13/630,839

(22) Filed: Sep. 28, 2012

(65) Prior Publication Data

US 2013/0021311 A1      Jan. 24, 2013

Related U.S. Application Data

(63) Continuation of application No. PCT/JP2011/056916, filed on Mar. 23, 2011.

(30) Foreign Application Priority Data

Mar. 29, 2010 (JP) ................................ 2010-076445

(51) Int. Cl.
*G02B 27/01* (2006.01)

(52) U.S. Cl.
CPC .... *G02B 27/0176* (2013.01); *G02B 2027/0156* (2013.01); *G02B 2027/0178* (2013.01)

(58) Field of Classification Search
CPC .............. G02B 2027/0156; G02B 2027/0178; G02B 27/0176
See application file for complete search history.

(56) References Cited

U.S. PATENT DOCUMENTS

| 5,003,300 | A | * | 3/1991 | Wells ................................. 345/8 |
| 5,266,930 | A | | 11/1993 | Ichikawa et al. |
| 5,886,822 | A | | 3/1999 | Spitzer |
| 6,023,372 | A | | 2/2000 | Spitzer et al. |
| 6,091,546 | A | | 7/2000 | Spitzer |
| 6,204,974 | B1 | | 3/2001 | Spitzer |
| 6,313,864 | B1 | * | 11/2001 | Tabata ..................... G09G 5/00 345/8 |
| 6,349,001 | B1 | | 2/2002 | Spitzer |
| 6,356,392 | B1 | | 3/2002 | Spitzer |
| 6,384,982 | B1 | | 5/2002 | Spitzer |
| 6,729,726 | B2 | * | 5/2004 | Miller .................... G02C 11/10 351/123 |
| 6,762,885 | B1 | * | 7/2004 | Ogasawara et al. ........... 359/630 |

(Continued)

FOREIGN PATENT DOCUMENTS

| JP | 03-098481 | | 10/1991 |
| JP | 03-127389 | U | 12/1991 |

(Continued)

OTHER PUBLICATIONS

International Search Report dated May 24, 2011 of corresponding PCT application PCT/JP2011/056916.

*Primary Examiner* — Quan-Zhen Wang
*Assistant Examiner* — Chun-Nan Lin
(74) *Attorney, Agent, or Firm* — Banner & Witcoff, Ltd.

(57) ABSTRACT

A head mount display includes a first frame, a display, a second frame, and a junction. The display is mountable on the first frame. The second frame is configured to be pivotably connected to the first frame and includes a circuit module. The circuit module includes a power circuit configured to supply power to the display. The junction is configured to electrically connect the display and the circuit module.

13 Claims, 14 Drawing Sheets

(56) References Cited

U.S. PATENT DOCUMENTS

| | | | |
|---|---|---|---|
| 2002/0149545 A1* | 10/2002 | Hanayama et al. | 345/7 |
| 2004/0070823 A1* | 4/2004 | Radna | 359/407 |
| 2006/0116000 A1* | 6/2006 | Yamamoto | 438/795 |
| 2006/0238550 A1* | 10/2006 | Page | 345/661 |
| 2008/0106694 A1 | 5/2008 | Blum et al. | |
| 2009/0073082 A1* | 3/2009 | Yoshikawa | 345/8 |
| 2009/0085833 A1* | 4/2009 | Otsuki | G02B 27/017 345/8 |
| 2009/0195479 A1 | 8/2009 | Kato et al. | |
| 2010/0007581 A1* | 1/2010 | Kato et al. | 345/8 |
| 2010/0026609 A1* | 2/2010 | Otsuki et al. | 345/8 |
| 2010/0110368 A1* | 5/2010 | Chaum | 351/158 |
| 2012/0062445 A1* | 3/2012 | Haddick et al. | 345/8 |
| 2013/0201440 A1 | 8/2013 | Howell et al. | |

FOREIGN PATENT DOCUMENTS

| | | |
|---|---|---|
| JP | 11-075142 A | 3/1999 |
| JP | 2001-522063 A | 11/2001 |
| JP | 2004-096224 A | 3/2004 |
| JP | 2009-044250 A | 2/2009 |

* cited by examiner

HEAD-MOUNTABLE DISPLAY DEVICE WITH PIVOTING CIRCUIT SUPPORT

CROSS-REFERENCE TO RELATED APPLICATION

The present application is a Continuation-in-Part of International Application PCT/JP2011/056916, filed on Mar. 23, 2011, which claims the benefit of Japanese Patent Application No. 2010-076445, filed on Mar. 29, 2010, each of which is incorporated herein by reference.

BACKGROUND OF THE DISCLOSURE

1. Field of the Disclosure

The present disclosure relates to a head mount display and, in particular, to a head mount display having a power supply that is mounted in a frame and that supplies electric power to a display.

2. Description of the Related Art

In recent years, a variety of head mount displays serving as mobile image display units used for game machines and mobile information terminal devices have been available in the market. In one of existing types of head mount display, devices, such as a microphone, a speaker, a camera, and a display, are mounted on an eyeglass frame. In order to operate these devices, a plug-in module includes a plurality of batteries and a plurality of electronic circuits. The plug-in module is connected to the rear ends of right and left temples using a strap. The plug-in module is disposed so as to be located at the back of the head of a user. If the plug-in module is too large, the strap can be extended so that the user can keep the plug-in module in their pocket.

SUMMARY OF THE DISCLOSURE

The plug-in module is connected to an eyeglass frame to the rear end of a temple of the eyeglass frame. Accordingly, if the plug-in module is compact and light-weight, the user needs to wear the eyeglass frame while setting the plug-in module at one of certain limited positions of the back of the head so that the plug-in module can be connected to the rear end of the temple of the eyeglass frame. That is, even when the plug-in module is compact and light-weight, the user needs to wear the eyeglass frame while paying attention to the position of the plug-in module. Therefore, the wearability of the eyeglass frame is decreased. In addition, a small and light-weight plug-in module includes a relatively small capacity battery. Therefore, the operating time of the image display unit is relatively short, which is problematic.

In contrast, if the capacity of the battery included in the plug-in module is relatively large, the plug-in module is large-sized and heavy. When the plugin module is placed at the back of the head of the user, the eyeglass frame is pulled backward due to the weight of the plug-in module. Thus, part of the user's face in contact with the eyeglass frame is pressed. Accordingly, the user feels unpleasant after wearing the eyeglass frame for a long time. To work around such a problem arising when the plug-in module is large and heavy, the user may extend the strap and store the plug-in module in their pocket. However, a long strap extends downward from the rear end of the temple of the eyeglass frame. Thus, the long strap may interfere with the movement or the operation of the user wearing the eyeglass frame.

Accordingly, the present disclosure may provide a head mount display that has a power supply mounted in a frame and that is capable of improving the wearability.

An aspect of the present disclosure is a head mount display including a first frame, a display, a second frame, and a junction. The display is mountable on the first frame. The second frame is configured to be pivotably connected to the first frame and includes a circuit module. The circuit module includes a power circuit configured to supply power to the display. The junction is configured to electrically connect the display and the circuit module.

Another aspect of the present disclosure is a head mount display including a first frame means, a display means, a circuit means, a second frame means, and a junction means. The first frame means is for being mountable on a head of a user. The display means is for displaying an image. The circuit means is for supplying power to the display means. The second frame means is for housing the circuit means. The junction means is for electrically connecting the display and the circuit means.

Another aspect of the present disclosure is a second frame including a circuit module, and a slidable contact. The circuit module includes a power circuit configured to supply power to a display. The slidable contact is electrically connected to the power circuit. The second frame is configured to be pivotably connected to a first frame mounted with the display. The slidable contact is configured to slide on a conductor of the first frame when in contact, the conductor is electrically connected to the display.

DESCRIPTION OF THE PREFERRED EMBODIMENTS

First Embodiment

Figure 1:
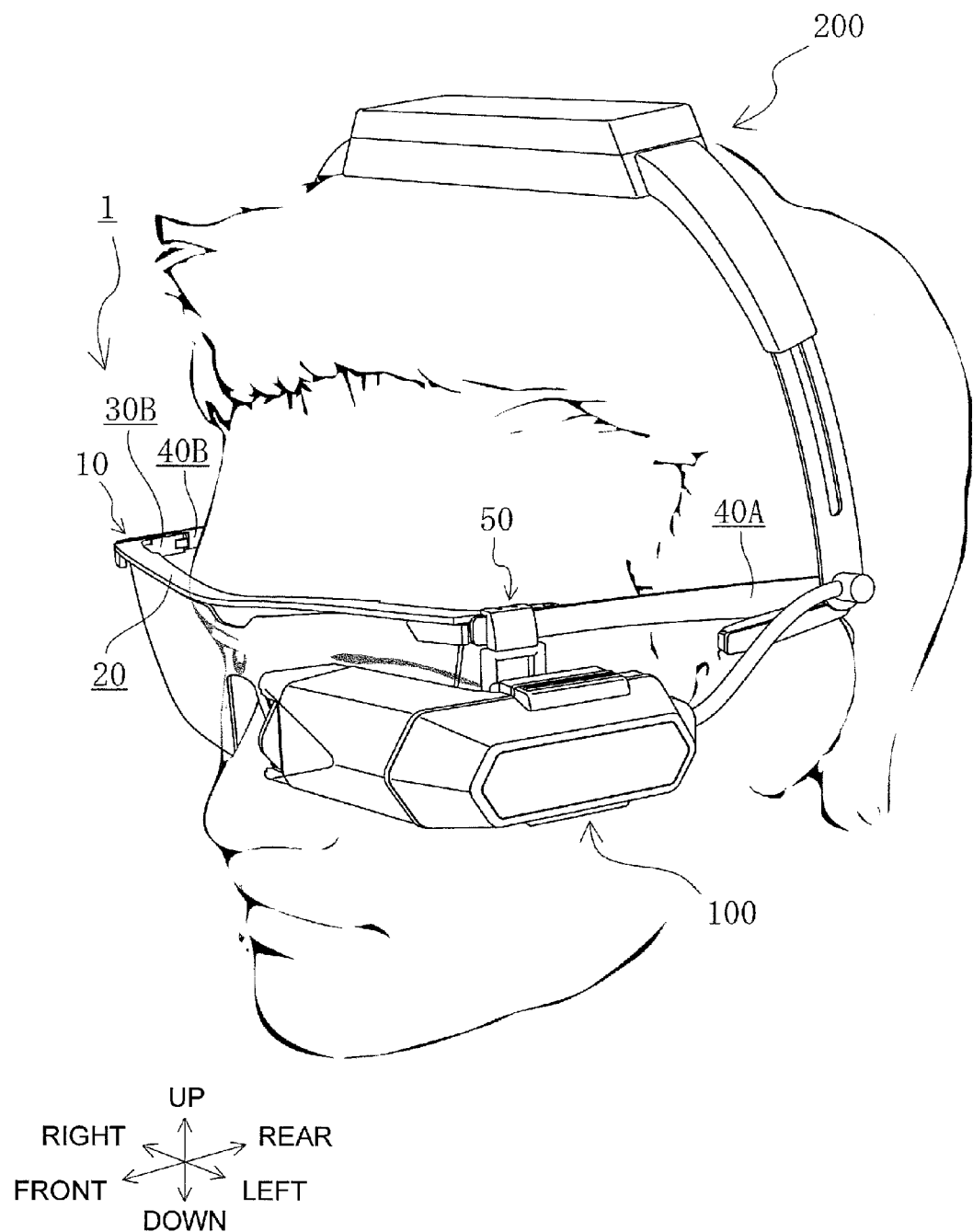
FIG. 1 is a perspective view of a first frame of a head mount display mounted on the user's head according to a first embodiment of the present disclosure.

A head mount display according to a first embodiment of the present disclosure is described below with reference to the accompanying drawings. The present embodiment represents only one of the aspects of the present disclosure, and any one of components may be replaced, added, and removed.

Overall External Structure

The overall external structure of a head mount display 1 according to the present embodiment is described below with reference to FIGS. 1 and 2. The head mount display 1 includes a first frame 10 of an eyeglass type, a support mechanism 50, a display 100 supported on the first frame 10 by the support mechanism 50, and a second frame 200 pivotably mounted on the first frame 10. The display 100 has a function of presenting a virtual image to a user. The display 100 includes, for example, a spatial light modulation element and an eyepiece optical system. For example, a liquid crystal display device or an organic electro-luminescence (EL) display device is used as the spatial light modulation element. The display 100 may be a retinal scanning display including a light beam generation unit for generating image light, such as three-primary color laser beams, in accordance with an image signal and a scanning unit having a galvanomirror for projecting the image light onto the retina. As used herein (in the specification and drawings), the terms "up-down direction", "front-rear direction", and "right-left direction" are used to describe the directions as viewed from the user illustrated in FIG. 1 and are indicated by arrows in FIG. 1.

Structure of Frame

An structure of the first frame 10 of an eyeglass type is described in detail below with reference to FIGS. 2 and 3. As illustrated in FIG. 3, the first frame 10 includes a front body 20, a pair of left and right endpieces 30A and 30B, and a pair of left and right temples 40A and 40B. The pair of left and right temples 40A and 40B is an example of a pair of mountable portions. The front body 20 is an example of a connection portion connecting the pair of mountable portions.

Structure of Front Body

When, as illustrated in FIG. 1, the user wears the first frame 10, the front body 20 extends in the right-left direction as viewed from the user. As illustrated in FIG. 3, a pair of nose pad portions 21A and 21B is fixed to the middle portion of the front body 20. When the user wears the first frame 10, the nose pad portions 21A and 21B are placed on the nose of the user. A protection cover 22 is fixed to the lower portion of the front body 20. When, as illustrated in FIG. 1, the user wears the first frame 10, the protection cover 22 is disposed so as to cover the right and left eyes of the user. The protection cover 22 protects the eyes of the user from touching part of the display 100. The protection cover 22 is formed from a transparent resin film.

Structure of Endpiece

As illustrated in FIG. 3, the left endpiece 30A and the right endpiece 30B are fixed to the left end and the right end of the front body 20, respectively. The left endpiece 30A and the right endpiece 30B extend backward such that the distance therebetween in the right-left direction gradually increases in the backward direction. The endpieces 30A and 30B are formed so as to be integrated with the front body 20. The left temple 40A and the right temple 40B are pivotably attached to the rear ends of the left endpiece 30A and the right endpiece 30B using attaching screws 41A and 41B extending in the up-down direction, respectively. That is, the temples 40A and 40B are pivotable about the axes of the attaching screws 41A and 41B extending in the up-down direction, respectively. As illustrated in FIG. 3, front portions 31A and 31B of the endpieces 30A and 30B, respectively, are formed so as to protrude outwardly.

Structure of Temple

The temples 40A and 40B includes temple bodies 42A and 42B, earpiece portions 43A and 43B, and auxiliary guide members 44A and 44B, respectively. The temple bodies 42A and 42B include attaching portions 45A and 45B pivotably attached to the rear ends of the endpieces 30A and 30B, respectively. The auxiliary guide members 44A and 44B connect temple bodies 42A and 42B to the earpiece portions 43A and 43B, respectively. The endpieces 30A and 30B have the same structure, and the right and left temples 40A and 40B have the same structure. Accordingly, only the right endpiece 30B and the right temple 40B are described with reference to FIGS. 2 and 3.

The temple body 42B extending in a front-rear direction is pivotably attached to the rear end of the endpiece 30B using the attaching screw 41B. As illustrated in FIG. 2, the auxiliary guide member 44B is connected to the rear end of the temple body 42B. The auxiliary guide member 44B is disposed under the temple body 42B and extends forward along the temple body 42B. The auxiliary guide member 44B is spaced apart from the temple body 42B by a predetermined distance. As illustrated in FIG. 3, the front portion of the auxiliary guide member 44B is curved toward the inside of the first frame 10. The top end of the front portion of the auxiliary guide member 44B is bent outward. The earpiece portion 43B is fixed to the top end of the auxiliary guide member 44B at a point where the auxiliary guide member 44B is bent. The earpiece portion 43B extends backward from that point while curving to the inside of the first frame 10. As illustrated in FIG. 2, the earpiece portion 43B is located under the temple body 42B. If a user with eyeglasses wears the first frame 10, the front body 20 and the temple body 42B are located above the front body and the temple of the eyeglasses of the user. Accordingly, the front body 20 and the temple body 42B do not interfere with the front body and the temple of the eyeglasses of the user.

As illustrated in FIG. 3, the attaching portion 45B connects the endpiece 30B to the temple 40B. The attaching portion 45B is formed so as to protrude from the left side surface of the temple body 42B. The attaching portion 45B has a through-hole that allows the attaching screw 41B to be inserted thereinto. The endpiece 30B has a rear end portion that pinches the attaching portion 45B in the up-down direction. The rear end portion has a through-hole that allows the attaching screw 41B to be inserted thereinto. The temple 40B is attached to the endpiece 30B in a pivotable fashion about the axis of the attaching screw 41B.

Structures of Support Mechanism and Extending Member

To set the display 100 on one of the right and left temples 40A and 40B in place, the support mechanism 50 is provided. The support mechanism 50 is primarily formed from an attachment member 60 attached to the display 100.

Structure of Extending Member

Left and right extending members 51A and 51B are attached to the left and right temples 40A and 40B, respectively. Since the extending members 51A and 51B have the same structure, only the extending member 51A is described. As illustrated in FIG. 3, the extending member 51A extends forward from a point of the temple body 42A at which the attaching portion 45A is disposed and is integrated with the temple body 42A.

Structure of Attachment Member

Figure 2:
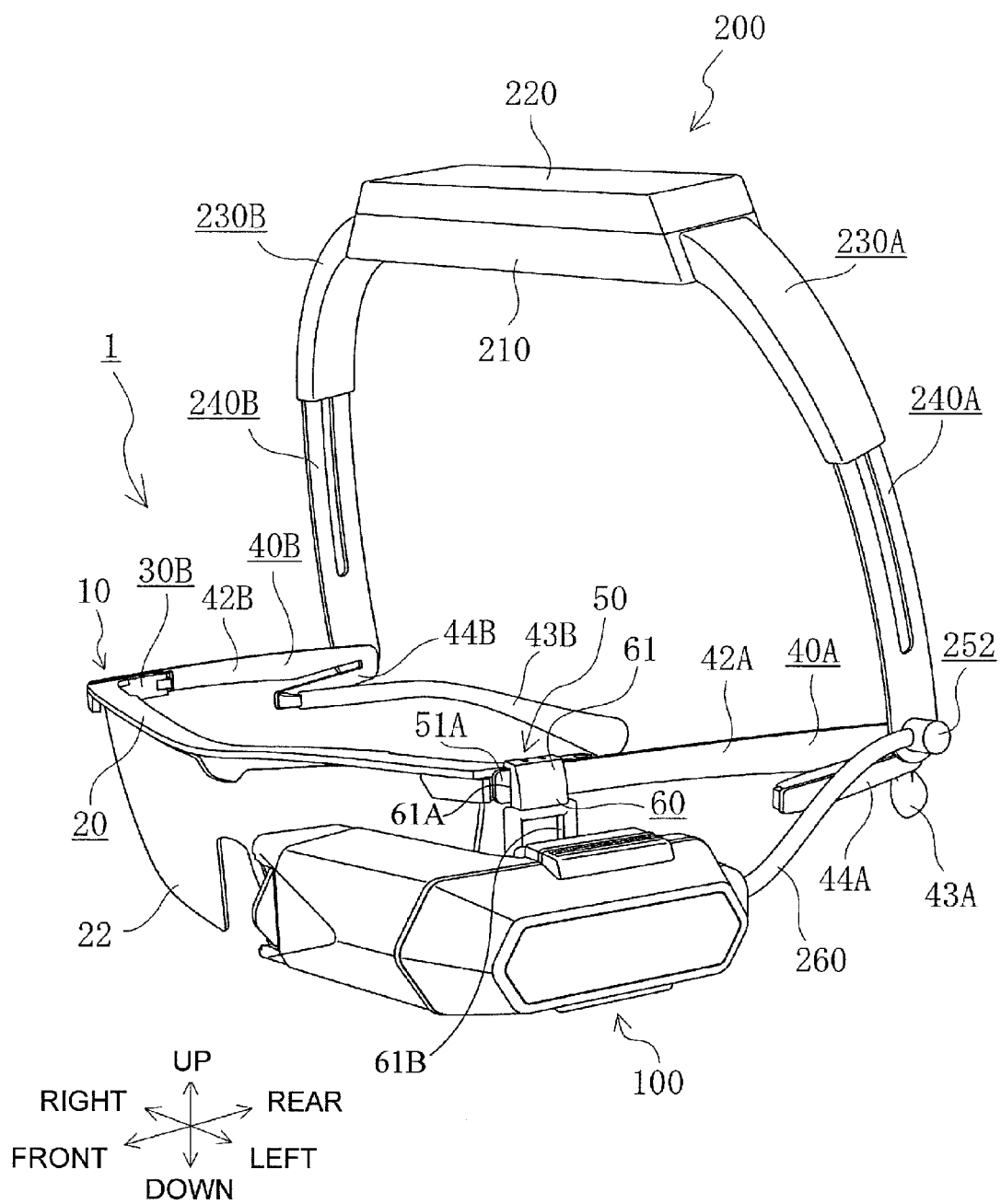
FIG. 2 is a perspective view of the head mount display.
Figure 3:
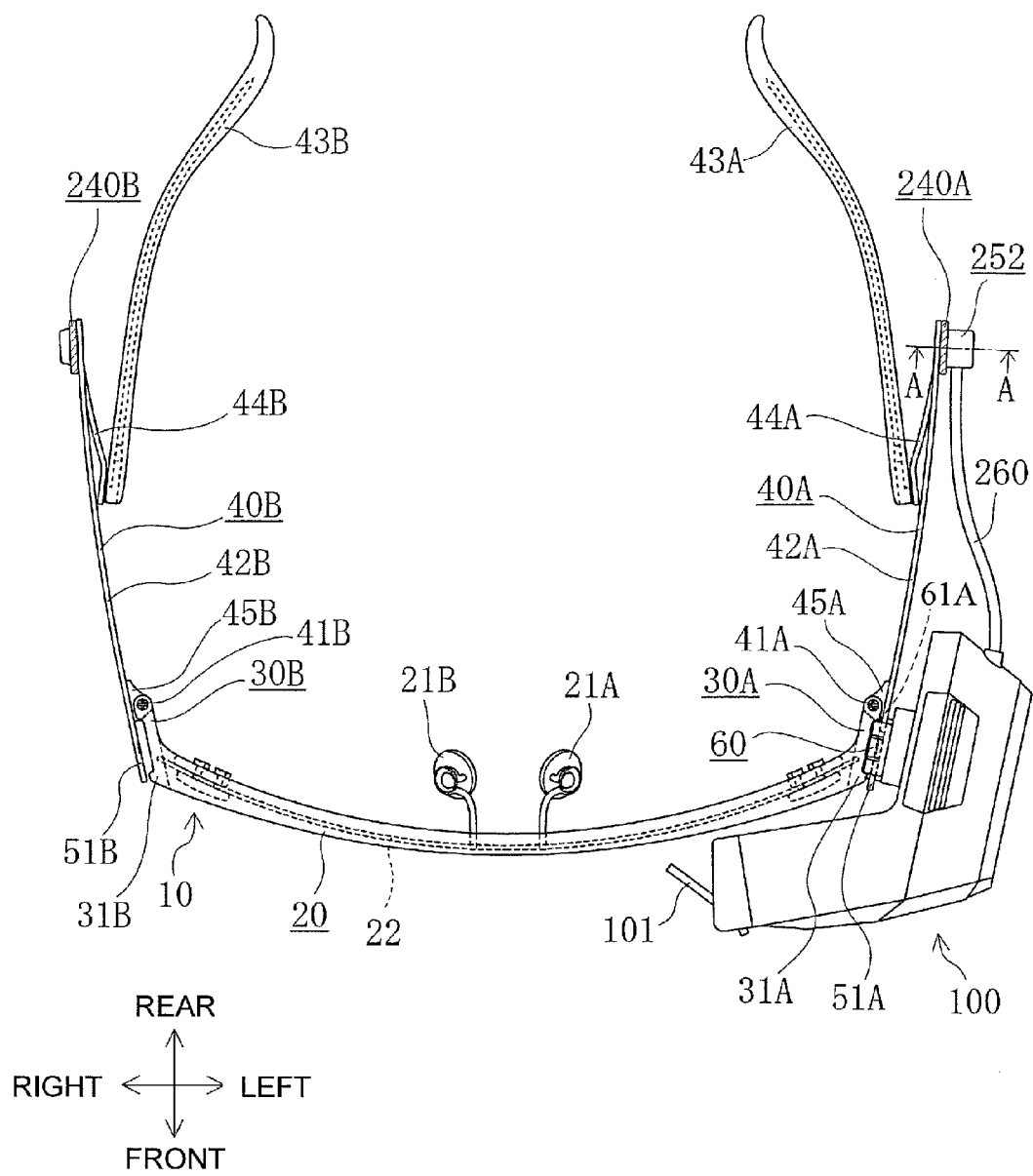
FIG. 3 is a plan view of the first frame having a display attached thereon viewed from above with two connection bands of a second frame removed.

As illustrated in FIG. 2, the attachment member 60 includes an attachment member body 61. The attachment member body 61 includes an attachment hole 61A that penetrates the upper portion the attachment member body 61 in the front-rear direction. The attachment member body 61 further includes an attachment groove 61B in the lower portion thereof. The attachment groove 61B extends in the up-down direction. The attachment hole 61A allows the front end portion of the extending member 51A to be inserted thereinto. The attachment groove 61B allows a vertical sliding member attached to the display 100 to be fitted thereinto. According to the present embodiment, the structure of the attachment member 60 allows the up-down and right-left positions of the display 100 with respect to the left extending member 51A to be adjusted. In addition, the structure of the attachment member 60 allows the pivotal position of the display 100 about the pivot axis of the vertical sliding member to be varied.

Configuration of Display and Control Unit

The display 100 is formed, as, for example, the retinal scanning display. The display 100 includes a control unit that generates image light and an optical system that leads the generated image light to the eyes of the user. The control unit includes a three-primary color video signal supply circuit, a laser light source, a laser drive circuit, and a three-primary color laser combining optical system. The optical system incorporated into the display 100 includes a collimating lens, a horizontal scanning unit, a vertical scanning unit, and an eyepiece lens. As illustrated in FIG. 3, the display 100 has a transparent half mirror 101 in the vicinity of a light emitting opening in an angle adjustable manner.

In the display 100, a laser beam is emitted to the half mirror 101 via the internal optical system. The laser beam refracted by the half mirror 101 is emitted to the eyes of the user. If the laser beam is not emitted to the eyes, the user can view the background in front of the user through the half mirror 101.

Structure of Second Frame

The second frame 200 is described next with reference to FIG. 2 and FIGS. 4 to 8. As illustrated in FIG. 2, the second frame 200 includes a module casing 210, a cover 220, a pair of arms 230A and 230B fixed to the left and right ends of the module casing 210, and a pair of connection bands 240A and 240B connected to the arms 230A and 230B, respectively. The lower ends of the connection bands 240A and 240B are pivotably connected to the rear ends of the temple bodies 42A and 42B of the first frame 10, respectively.

Structures of Module Casing and Cover

Figure 4:
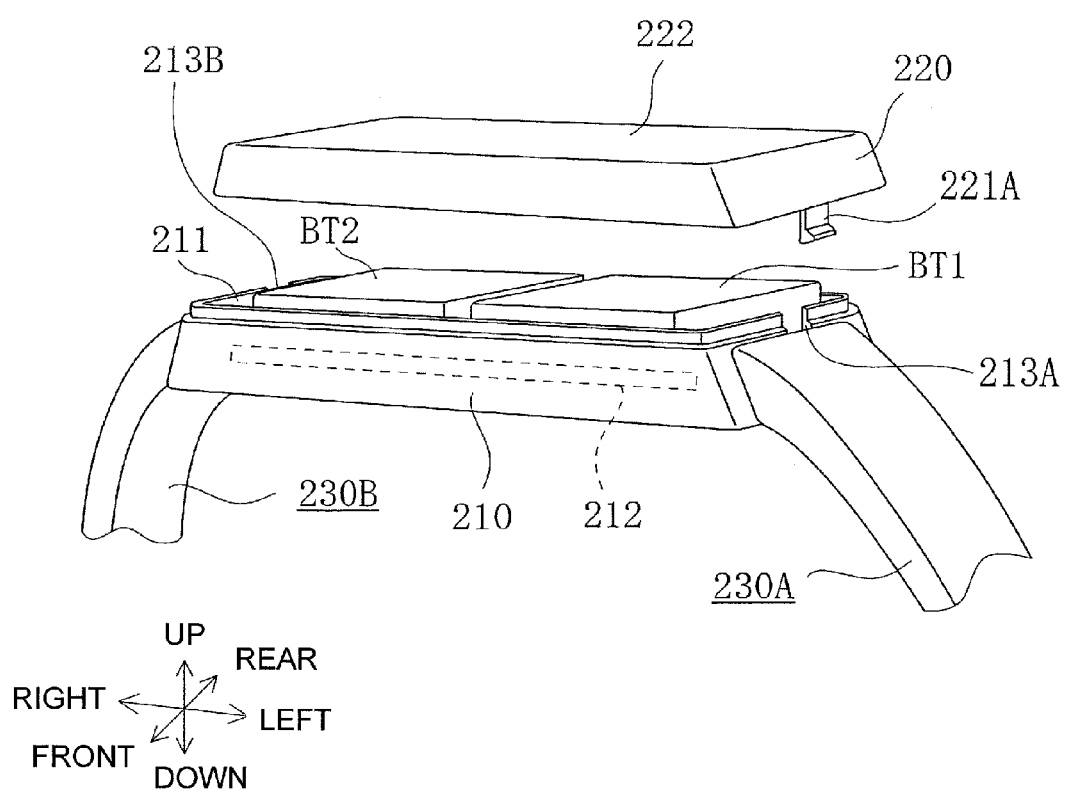
FIG. 4 is an enlarged perspective view of a module casing of the second frame and a cover of the module casing.

As illustrated in FIG. 4, the module casing 210 is formed of a synthetic resin. The module casing 210 includes a storage compartment 211 for storing replaceable batteries BT1 and BT2. The batteries BT1 and BT2 serve as a power supply that supplies the operating voltage for driving the display 100. The module casing 210 incorporates a power circuit unit 212. The power circuit unit 212 includes electric contacts connectable to the plus terminal and the minus terminal of each of the batteries BT1 and BT2. In addition, the power circuit unit 212 includes a circuit board having the electric contacts thereon. The module casing 210 has openings 213A and 213B formed in the left and right side surfaces, respectively. According to the present embodiment, the power circuit unit 212 has a circuit configuration in which the batteries BT1 and BT2 are connected in series.

As illustrated in FIG. 4, the cover 220 is formed of a synthetic resin. The cover 220 covers the storage compartment 211. The cover 220 has two resilient locking pawls on the right and left side surfaces of the lower portions thereof. In FIG. 4, only a left resilient locking pawl 221A is illustrated.

The two locking pawls are inserted into the openings 213A and 213B of the module casing 210 and are engaged with the inner wall of the module casing 210. The resilient locking pawl 221A is inserted into the opening 213A.

According to the present embodiment, an upper surface 222 of the cover 220 has a decoration pattern formed therein. The user can select a desired one of a plurality of covers having different decoration patterns formed therein and replace the cover 220 with the selected cover.

Structures of Arm and Connection Band

The arm 230A and the connection band 240A, which are disposed on the left side, have power supply elements for supplying the operating voltage from the batteries BT1 and BT2 to the display 100, such as supply lead lines, electric contacts, and switches. The right and left arms have the same structure, and the right and left connection bands have the same structure except for the configuration of the power supply elements. Accordingly, the left arm 230A and the left connection band 240A are mainly described below with reference to FIG. 5.

Figure 5:
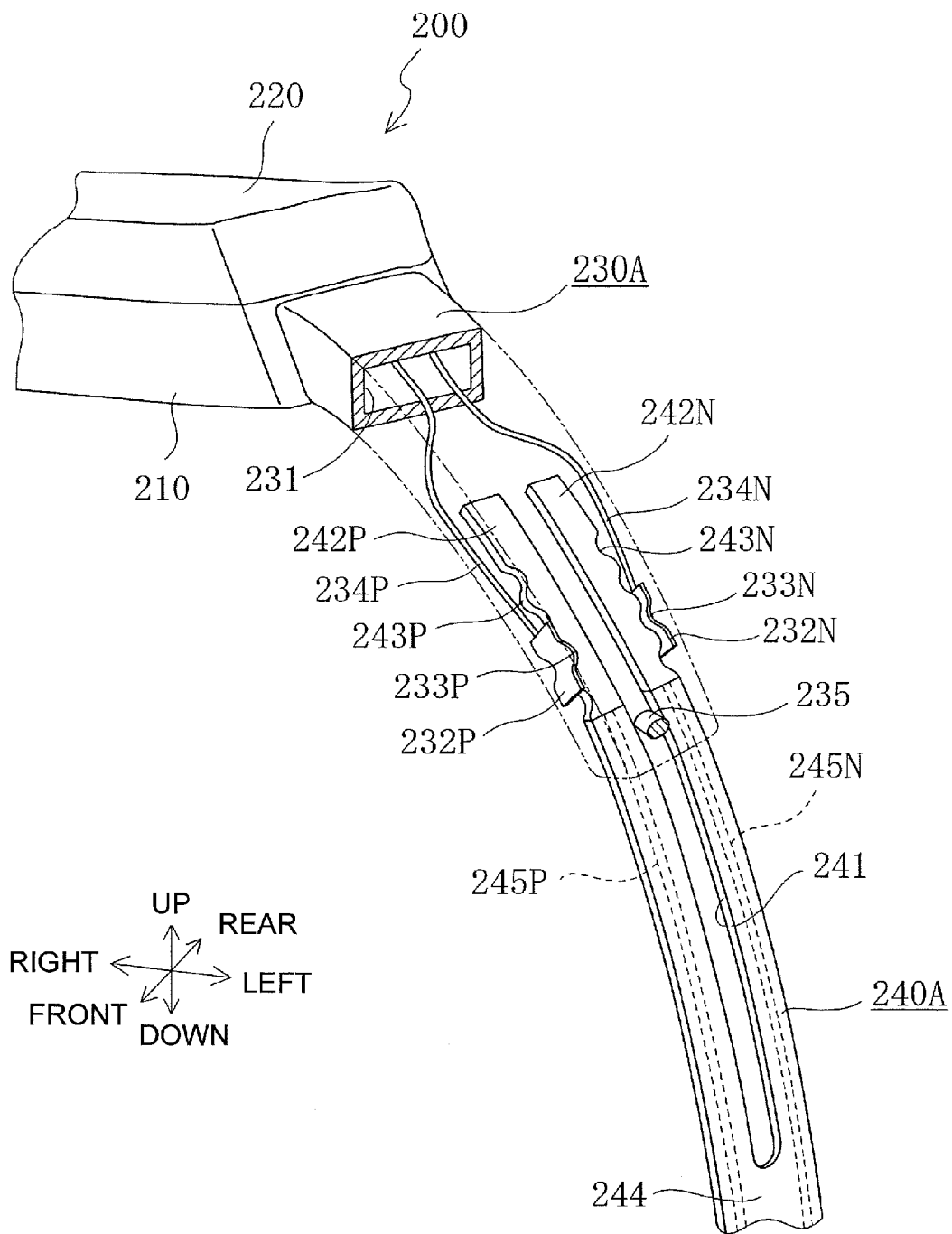
FIG. 5 is an enlarged perspective view of an arm and the connection band of the second frame with the arm partially removed.

The arm 230A is formed of synthetic resin. The arm 230A extends downward from the left end portion of the module casing 210 while curving. The arm 230A is fixed to the left end portion of the module casing 210. As illustrated in FIG. 5, the arm 230A is formed so as to be hollow. Inner walls 231 of the arm 230A form an inner space, which communicates with the storage space formed in the storage compartment 211 of the module casing 210. Among the inner walls 231 of the arm 230A, two electric contacts 232P and 232N are fixed to two inner walls facing each other in the front-rear direction. The electric contacts 232P and 232N include protrusion portions 233P and 233N, respectively. The protrusion portions 233P and 233N are formed in facing surfaces while curving. The electric contacts 232P and 232N are connected to lead lines 234P and 234N disposed in the internal space in the arm 230A, respectively. The lead line 234P connects, to the electric contact 232P, the plus terminal of the battery BT1 which is connected to the battery BT2 in series. The lead line 234N connects the electric contact 232N to the minus terminal of the battery BT2. A guide pin 235 is formed in the internal space formed in the lower end of the arm 230A so as to protrude into the inner space.

The upper end of the connection band 240A is extendably connected to the arm 230A. The lower end of the connection band 240A is pivotably connected to the temple body 42A. As illustrated in FIG. 5, the connection band 240A includes a long slot 241 that extends in the up-down direction. The guide pin 235 is fitted into the long slot 241. The guide pin 235 guides relative movements of the arm 230A and the connection band 240A in the up-down direction. That is, the guide pin 235 that is fitted into the long slot 241 guides an extending and retracting movement of the connection band 240A relative to the arm 230A.

The connection band 240A has two movable contacting pieces 242P and 242N in top end portion thereof. The movable contacting pieces 242P and 242N are formed of a conductive material. The movable contacting piece 242P has a waved end edge portion 243P that is in contact with the protrusion portion 233P of the electric contact 232P. Similarly, the movable contacting piece 242N has a waved end edge portion 243N that is in contact with the protrusion portion 233N of the electric contact 232N. The electric contacts 232P and 232N are formed of a conductive elastic material. Thus, the electric contacts 232P and 232N can set the points at which they are in contact with the waved end edge portions 243P and 243N, respectively, unchanged using their resiliency. Each of the end edge portions 243P and 243N has a plurality of curved recess portions so that a desired one of a plurality of different contact points can be selected.

The connection band 240A has a band body 244. The connection band 240A is disposed in a lower portion than the movable contacting pieces 242P and 242N. The band body 244 is formed of a non-conductive material, such as a synthetic resin. Two conductor members 245P and 245N are embedded in the band body 244 so as to extend in the up-down direction. The conductor members 245P and 245N are connected to the movable contacting pieces 242P and 242N, respectively.

Connection Between Temple Body and Connection Band

An structure for pivotably connecting the temple body 42A to the connection band 240A is described next with reference to FIGS. 6 to 8.

A rotation shaft 246 is fixed to the left side surface of the temple body 42A so as to protrude from the left side surface in the horizontal direction. Two locking protrusions 247 and 248 are formed so as to protrude from the left side surface of the temple body 42A. The locking protrusions 247 and 248 are disposed at symmetrical positions with respect to the rotation shaft 246 in the up-down direction. Each of the locking protrusions 247 and 248 has a semispherical shape.

A pivot hole 249 is formed in the lower end portion of the connection band 240A. The rotation shaft 246 is inserted into the pivot hole 249. A plurality of recess portions 250 are formed in the right side surface of the connection band 240A. The plurality of recess portions 250 are equiangularly formed around the pivot hole 249 so that the locking protrusions 247 and 248 fit into the recess portions 250. Each of the recess portions 250 has a semispherical shape.

A circular leaf spring 251 is inserted into the rotation shaft 246. The circular leaf spring 251 is disposed in order to urge the connection band 240A against the temple body 42A by the elastic force. Since the connection band 240A is urged against the temple body 42A by the elastic force, the locking protrusions 247 and 248 are continuously fitted into the recess portions 250.

A fixing member 252 has a circular cylindrical shape. The fixing member 252 is used for mounting the connection band 240A to the rotation shaft 246. The fixing member 252 has a support hole 253 that allows the top end of the rotation shaft 246 to be inserted thereinto. The fixing member 252 has a notch 254 at a predetermined position of the inner wall of the support hole 253. An elastic spring piece 255 is attached to the rotation shaft 246 in the vicinity of the top end of the rotation shaft 246. The elastic spring piece 255 can be fitted into the notch 254. Fitting of the elastic spring piece 255 into the notch 254 can be set by the elastic force of the elastic spring piece 255. Thus, the fixing member 252 is reliably attached to the rotation shaft 246 at a predetermined pivotal position. After the connection band 240A and the leaf spring 251 are inserted into the rotation shaft 246, the right side surface of the fixing member 252 urges the connection band 240A against the temple body 42A using the leaf spring 251. That is, the fixing member 252 is fixed to the temple body 42A of the first frame 10.

Figure 6:
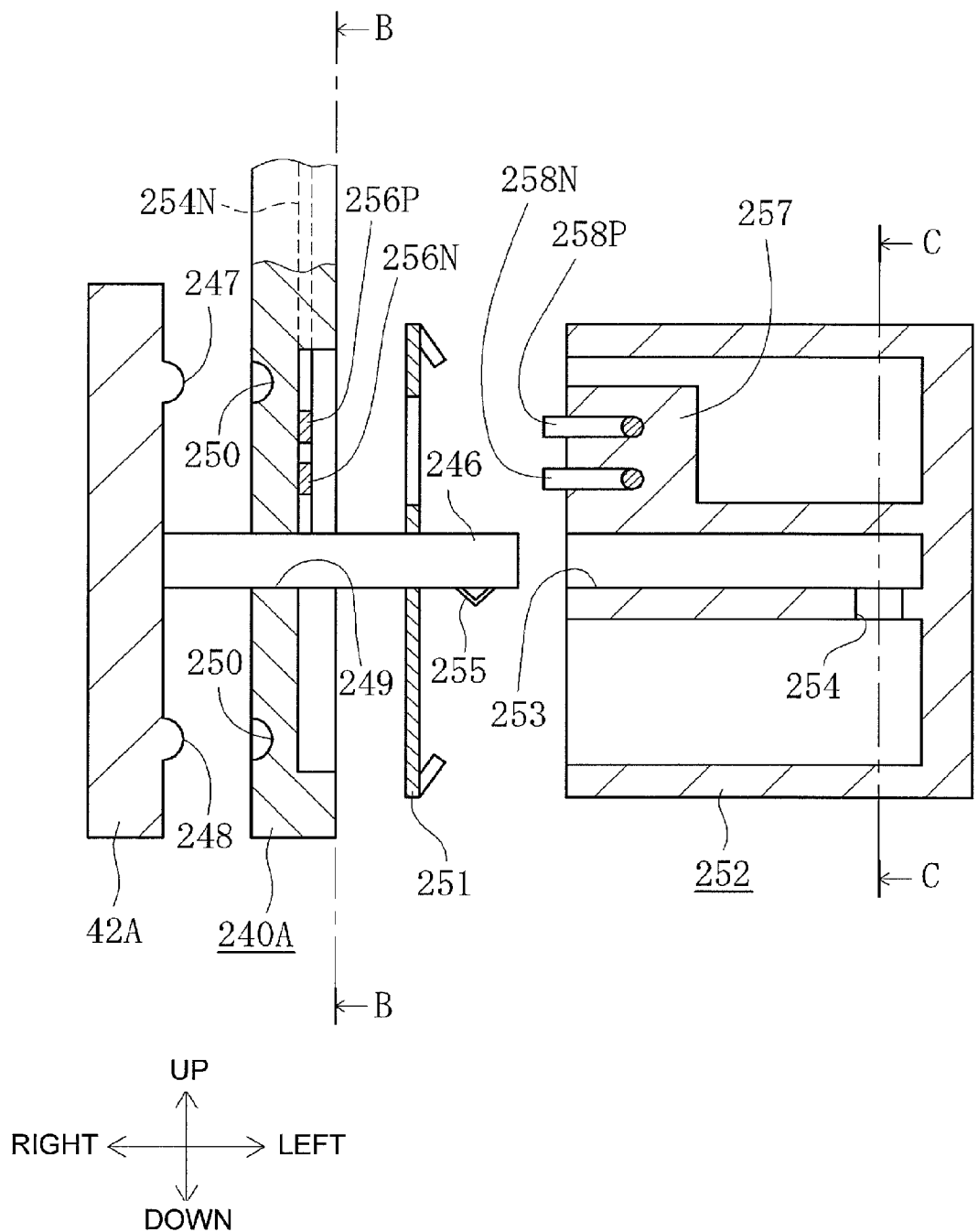
FIG. 6 is an exploded cross-sectional view of a temple body, the connection band, a leaf spring, and a fixing member taken along a line A-A of FIG. 3.
Figure 7:
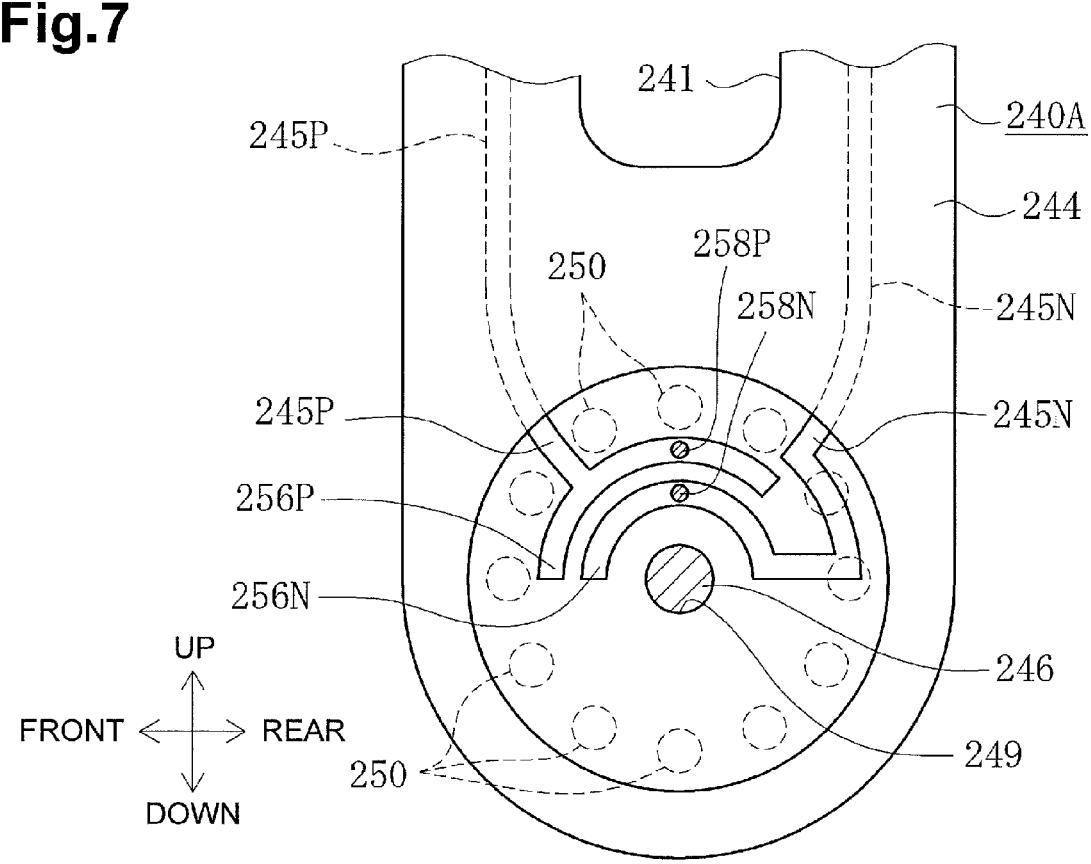
FIG. 7 is a left side view of the connection band when a rotation shaft is cut along a line B-B of FIG. 6.
Figure 8:
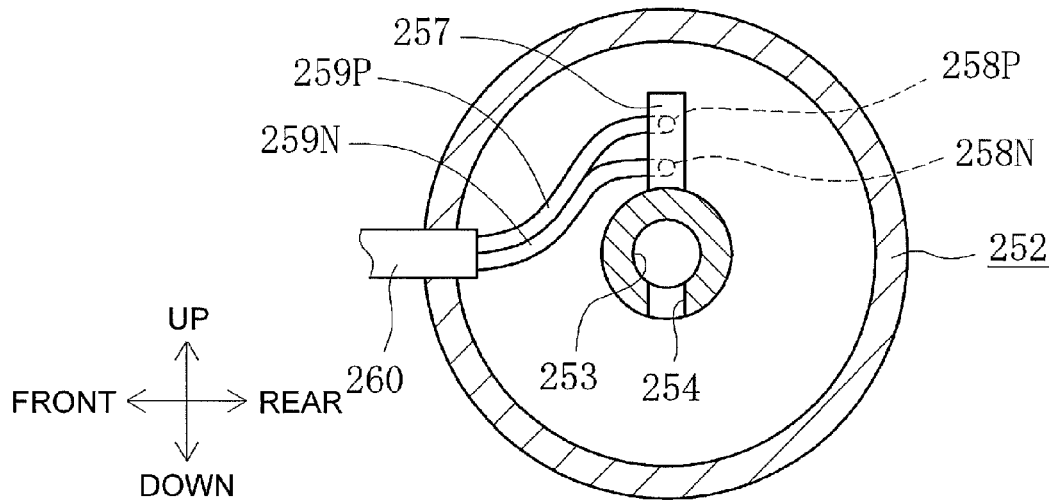
FIG. 8 is a cross-sectional view of the fixing member taken along a line C-C of FIG. 6.

As illustrated in FIG. 7, the connection band 240A included in the second frame 200 has a conductor member 256P and a conductor member 256N at the lower end thereof. Each of the conductor members 256P and 256N is in the form of a circular arc with the center located at the center of the pivot hole 249. The conductor member 256P is connected to the conductor member 245P. The conductor member 256N is connected to the conductor member 245N. As illustrated in FIGS. 6 and 8, the fixing member 252 has a fixing base 257 therein. The fixing base 257 fixes two sliding contacts 258P and 258N. The sliding contact 258P is slidable on the conductor member 256P when the sliding contact 258P is in contact with the conductor member 256P. In addition, the sliding contact 258N is slidable on the conductor member 256N when the sliding contact 258N is in contact with the conductor member 256N. That is, the fixing member 252, which is a part of the first frame 10, provides the sliding contacts 258P and 258N to the connection band 240A. The sliding contacts 258P and 258N are connected to lead lines 259P and 259N, respectively.

As illustrated in FIG. 2, a connection line 260 is formed from the lead lines 259P and 259N bound together. The connection line 260 connects the fixing member 252 to the display 100. The connection line 260 is connected to the display 100 so as to be removable using well-known electric connection components (i.e., a plug and a jack).

Motion and Operation

Figure 9:
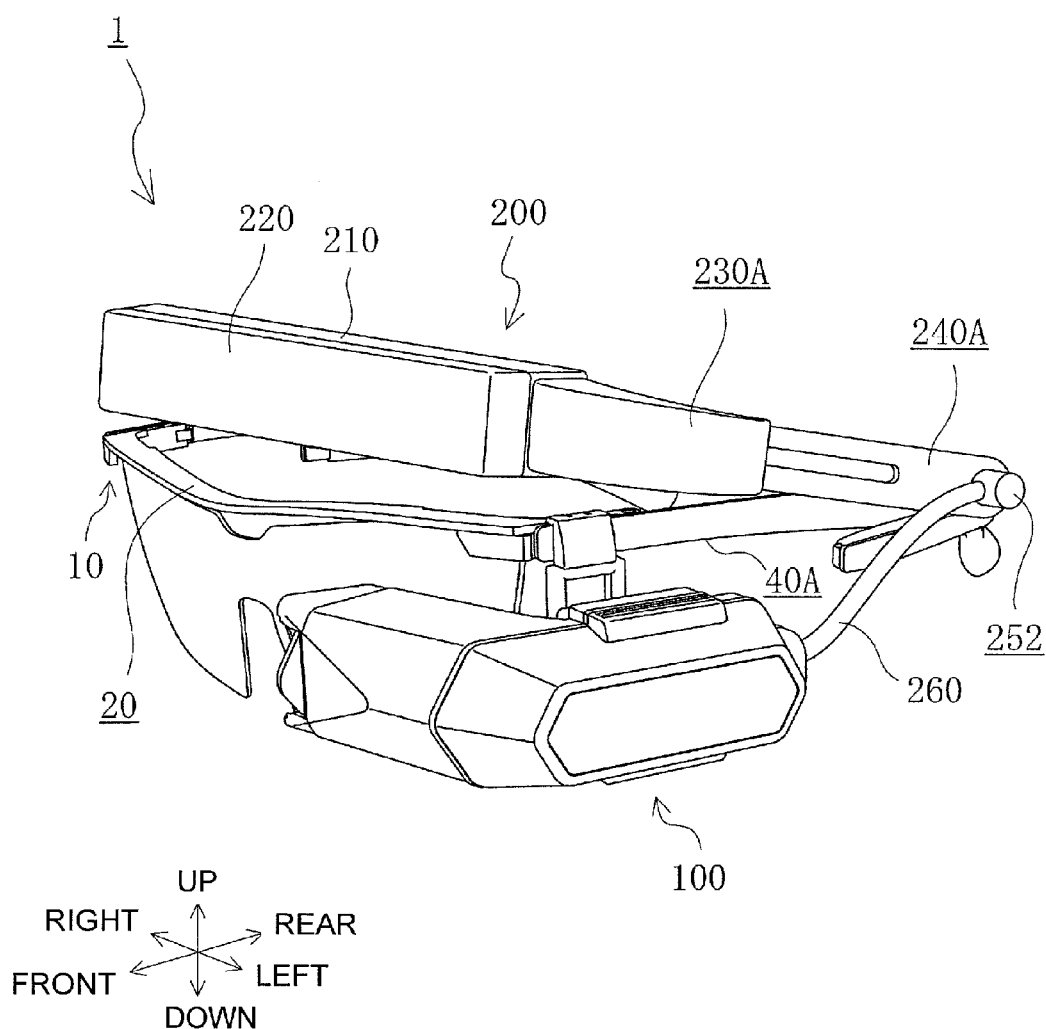
FIG. 9 is a perspective view of the head mount display with the second frame located at a front pivot position.

The motion and operation of the above-described configuration according to the present embodiment are described next with reference to FIGS. 9 to 11.

Operation to Mount Display

The display 100 may be mounted on either right or left side of the first frame 10. According to the present embodiment, as an example, the display 100 is mounted on the left side of the first frame 10. As illustrated in FIG. 3, the user slightly rotates the left temple 40A about the axis line of the attaching screw 41A in the counterclockwise direction without wearing the first frame 10. Due to the rotation, the extending member 51A is separated from the endpiece 30A. The user inserts the attachment member body 61 into the front end portion of the extending member 51A from the front side. Through such insertion operation, the attachment member 60 is supported by the first frame 10.

In order to reliably support the display 100, by, as illustrated in FIG. 3, rotating the left temple 40A about the axis line of the attaching screw 41A in the clockwise direction, the user can move the extending member 51A and the attachment member body 61 closer to the endpiece 30A. In such a proximity mode, the front portion 31A of the endpiece 30A protrudes from the front end surface of the attachment member body 61 and is located in front of the front end of the attachment member body 61. The protruding front portion 31A prevents the attachment member body 61 from moving forward on the extending member 51A and falling off. Through a simple operation performed by a user, that is, through a user operation to rotate the left temple 40A, the display 100 can be reliably supported by the extending member 51A without the need for a special operation, such as tightening an attaching screw.

Operation to Wear First Frame

After the display 100 is mounted on the first frame 10, the user rotates the second frame 200 until the second frame 200 reaches a front pivot position at which the module casing 210 of the second frame 200 is close to the front body 20 of the first frame 10. At the front pivot position, the user connects, to the display 100, the connection line 260 that extends from the fixing member 252.

When the second frame 200 is located at the front pivot position, the sliding contact 258N is in contact with the conductor member 256N. However, at that time, the sliding contact 258P is not in contact with the conductor member 256P. That is, the operating voltage is not supplied from the batteries BT1 and BT2 to the display 100. In such a mode, the user wears the first frame 10 from the front of their face. FIG. 10 illustrates the user wearing the first frame 10 with the second frame 200 being located at the front pivot position. Since the second frame 200 is located at the front pivot position, the user can easily wear the first frame 10 from the front of their face without being interfered by the second frame 200.

Operation to Adjust Pivot Position of Second Frame

Figure 10:
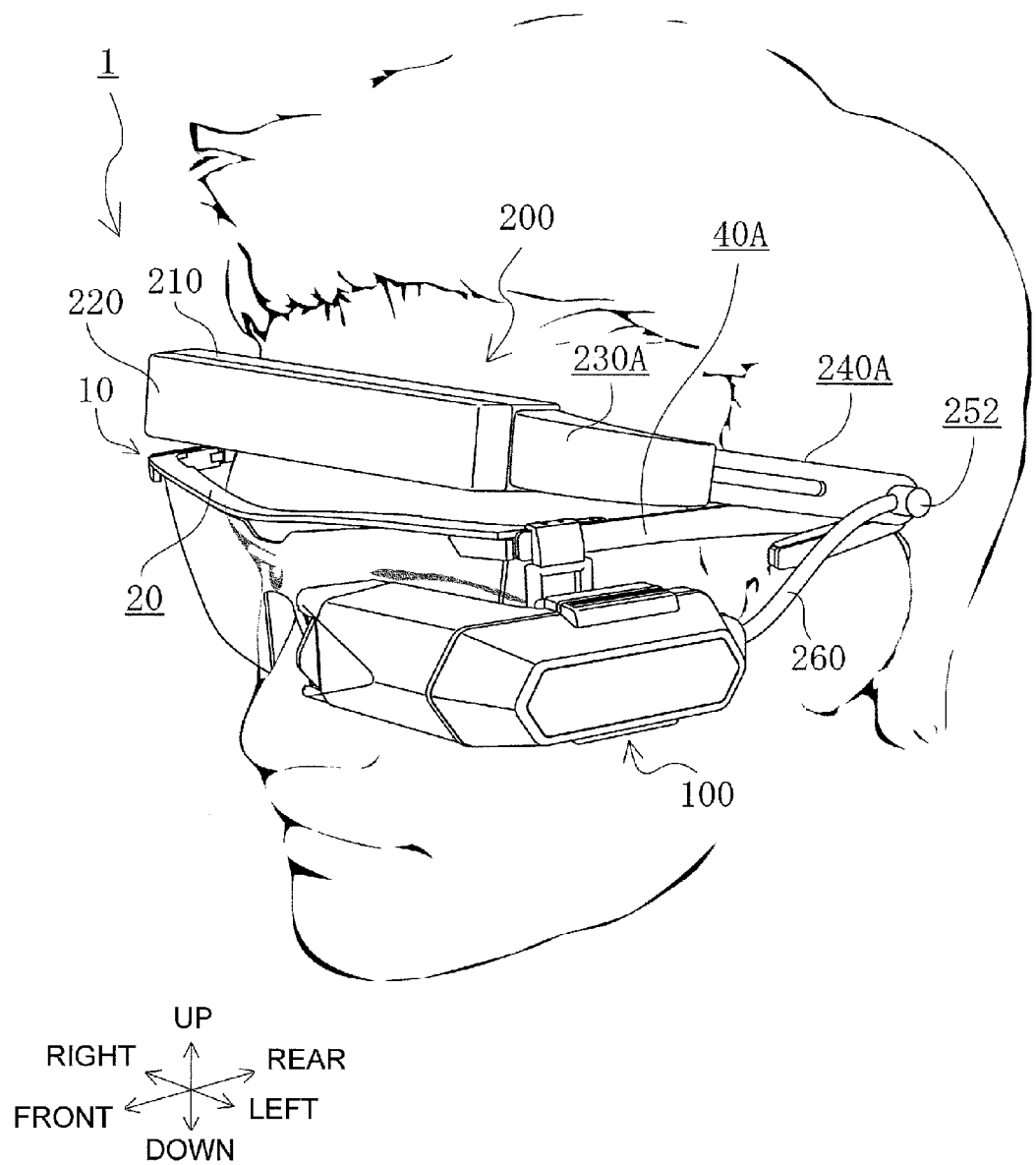
FIG. 10 is a perspective view of the first frame mounted on the user's head with the second frame located at the front pivot position.
Figure 11:
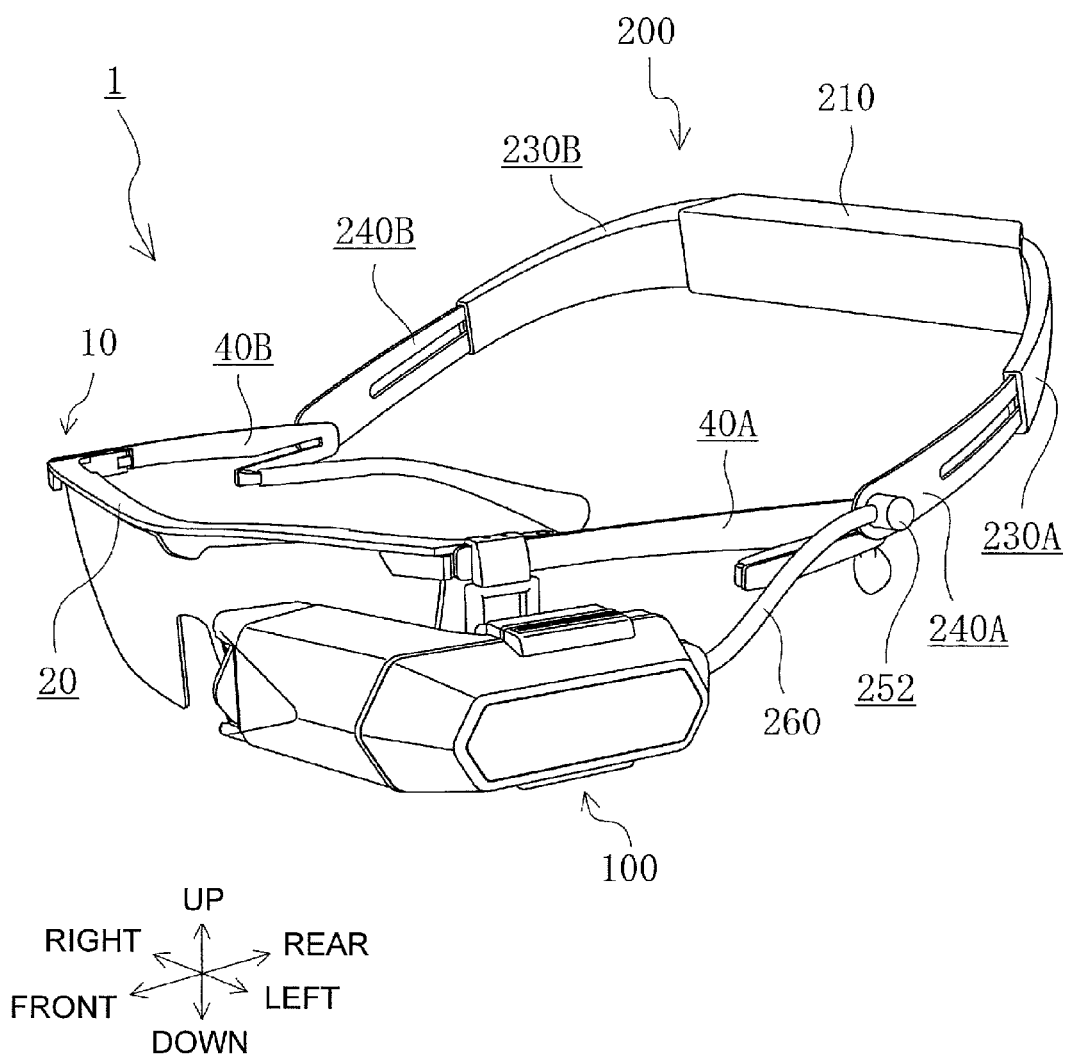
FIG. 11 is a perspective view of the head mount display with the second frame located at a rear pivot position.

When, as illustrated in FIG. 10, the second frame 200 is located in front of the user's face and in the vicinity of the right and left eyes, the user cannot see anything in the right-left direction and in the obliquely upward direction. In addition, the weights of the batteries BT1 and BT2 stored in module casing 210 are exerted on the front part of the user's head, such as the user's nose and a particular area of the user's face and, thus, the user sometimes cannot view the image displayed on the display 100 for a long time. Therefore, by changing the pivot position of the second frame 200 to a desired position, the user can prevent the weight of the second frame 200 from being exerted on a particular area of the body.

The user rotates the second frame 200 from the front pivot position illustrated in FIG. 10 in the clockwise direction. If the user rotates the second frame 200 to an about 45-degree position to the horizontal, the sliding contact 258N is brought into contact with the conductor member 256N and, in addition, the sliding contact 258P is brought into contact with the conductor member 256P. Since the sliding contacts 258P and 258N are in contact with the conductor members 256P and 256N, respectively, the operating voltage is supplied from the batteries BT1 and BT2 to the display 100. By simply rotating the second frame 200, the user who wears the first frame 10 can start supplying the operating voltage to the display 100.

To easily operate the head mount display at the situations of the time, the user who wears the first frame 10 can rotate the second frame 200 to a desired position (e.g., a pivot position immediately above the head as illustrated in FIG. 1). If necessary, the user can rotate the second frame 200 to a pivot position behind the head. The second frame 200 can reliably stay at the pivot position since the locking protrusions 247 and 248 are fitted into the recess portions 250.

Second Embodiment

A second embodiment of the present disclosure is described below with reference to FIGS. 12 to 15. The second embodiment differs from the first embodiment in that a second frame is removably attached to the first frame. Hereinafter, only a structure that differs from that of the first embodiment is described. The same numbering is used for the elements that are the same as in the first embodiment.

Figure 12:
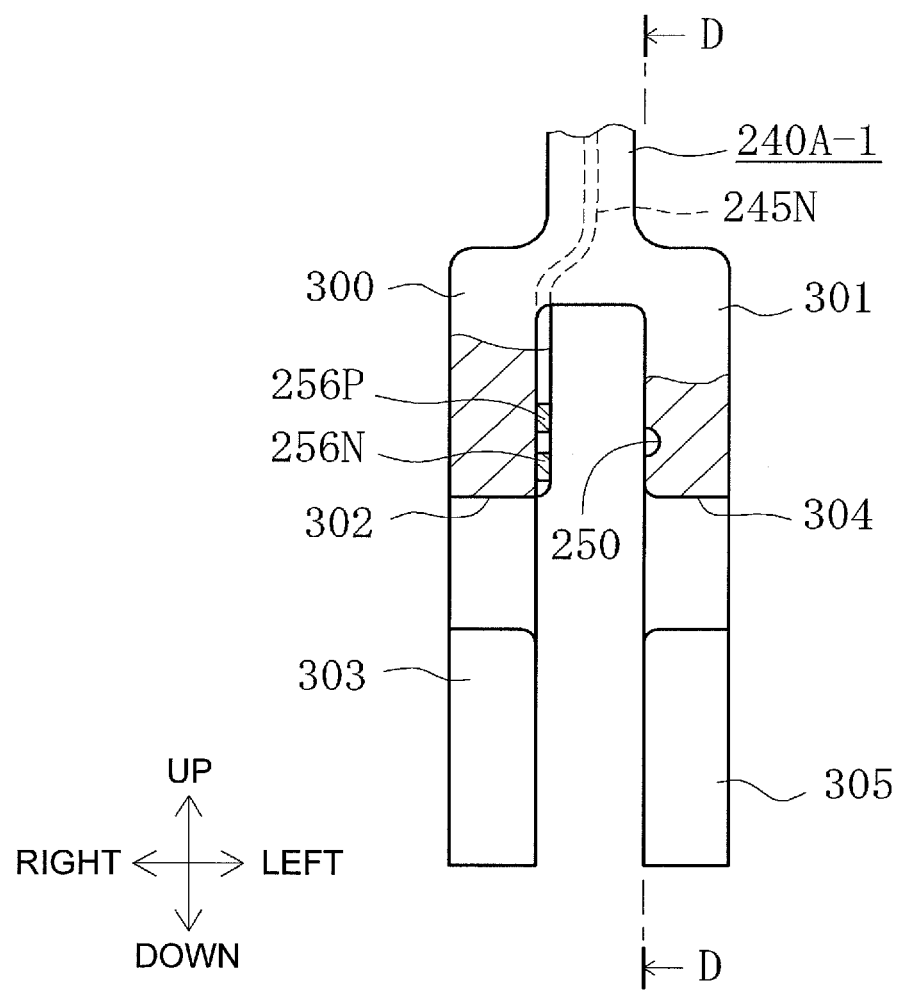
FIG. 12 is a front view of the lower end portion of a connection band according to a second embodiment of the present disclosure.
Figure 13:
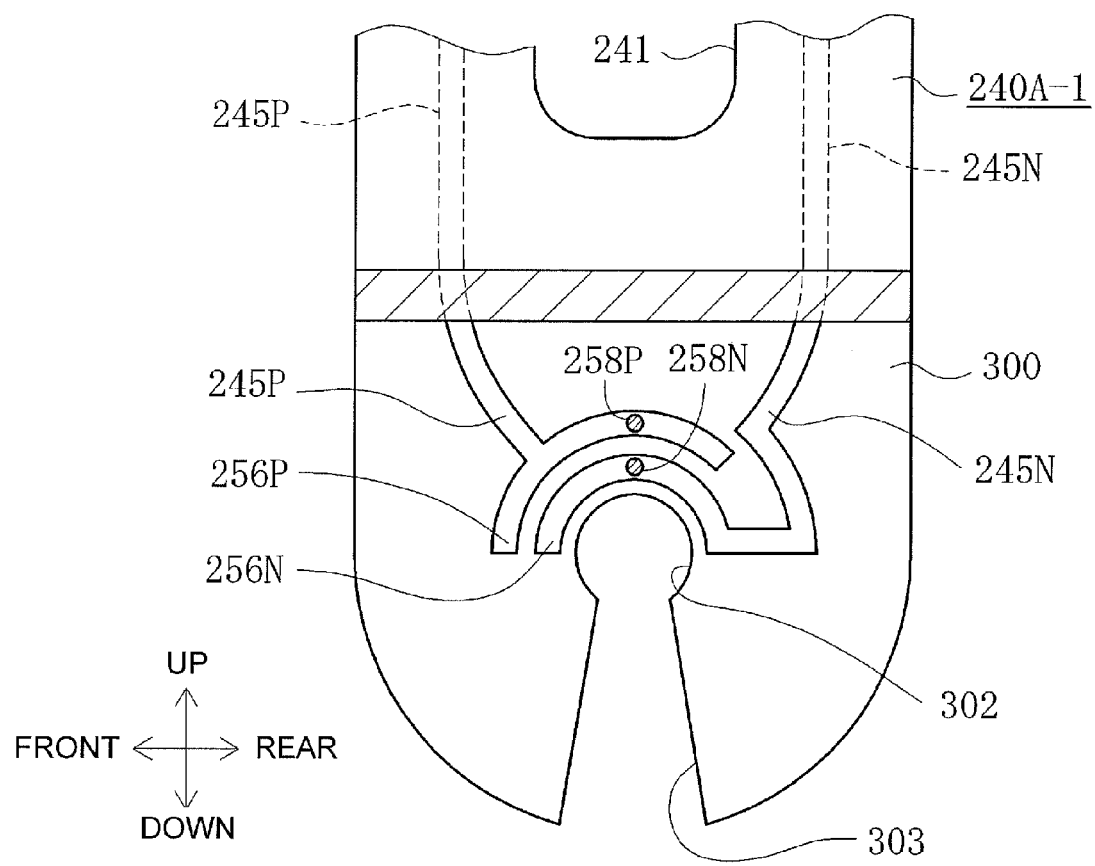
FIG. 13 is a partial cross-sectional view of the connection band taken along a line D-D of FIG. 12.

As illustrated in FIGS. 12 and 13, the lower portion of a connection band 240A-1 is fork-shaped and has two leg portions 300 and 301. The leg portion 300 includes a pivot hole 302 and an opening 303 that opens downward. Similarly, the leg portion 301 includes a pivot hole 304 and an opening 305 that opens downward. Like the connection band 240A of the first embodiment illustrated in FIG. 7, the leg portion 300 illustrated in FIG. 12 has the conductor members 256P and 256N on the left side surface thereof, each of which is in the form of a circular arc with the center located at the center of the pivot hole 302. The conductor members 256P and 256N are connected to the conductor members 245P and 245N which are connected to the batteries BT1 and BT2, respectively.

As illustrated in FIG. 12, like the connection band 240A of the first embodiment illustrated in FIG. 6, the leg portion 301 has a plurality of recess portions 250 on the right side surface thereof around the pivot hole 304.

Figure 14:
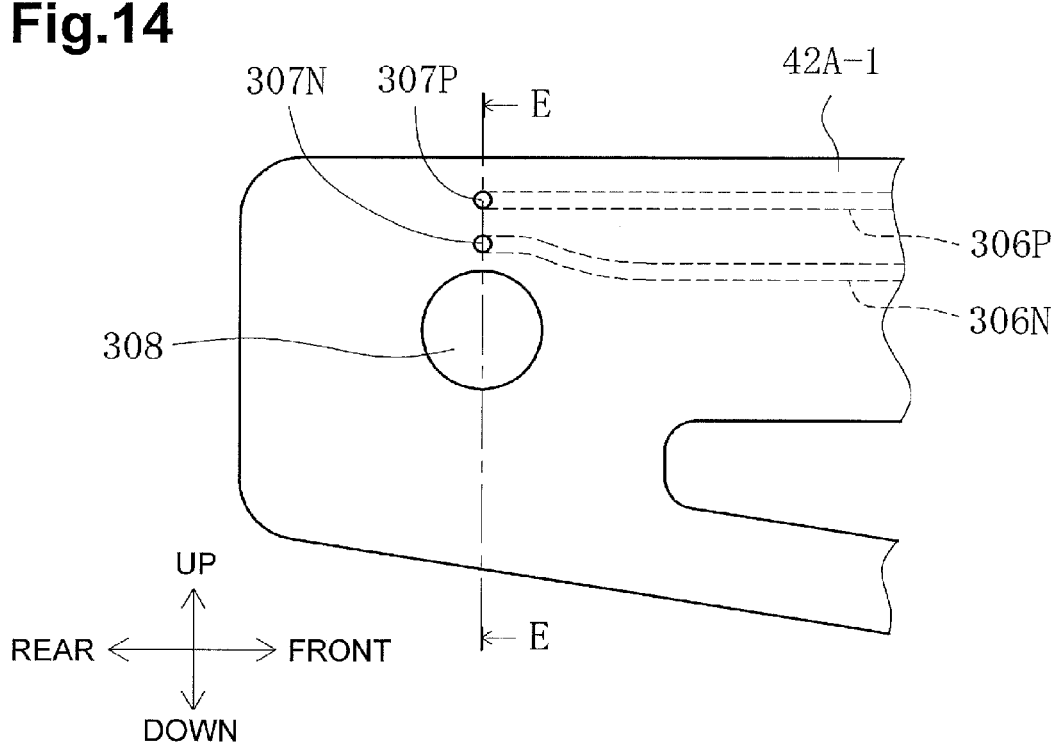
FIG. 14 is a right side view of a temple body according to the second embodiment.

As illustrated in FIG. 14, a pair of conductor members 306P and 306N is embedded in a temple body 42A-1. According to the second embodiment, the temple body 42A-1 is formed of a non-conductive synthetic resin. The conductor members 306P and 306N are disposed so as to extend to the extending member 51A located at the front end of the temple body 42A-1. The conductor members 306P and 306N are connected to the display 100 using well-known electric connection components (i.e., a plug and a jack). Although not illustrated, the electric connection components are provided in an attachment member (e.g., the attachment member 60 of the first embodiment illustrated in FIG. 2). When the attachment member is fitted into the extending member 51A, the conductor members 306P and 306N are connected to the display 100.

Figure 15:
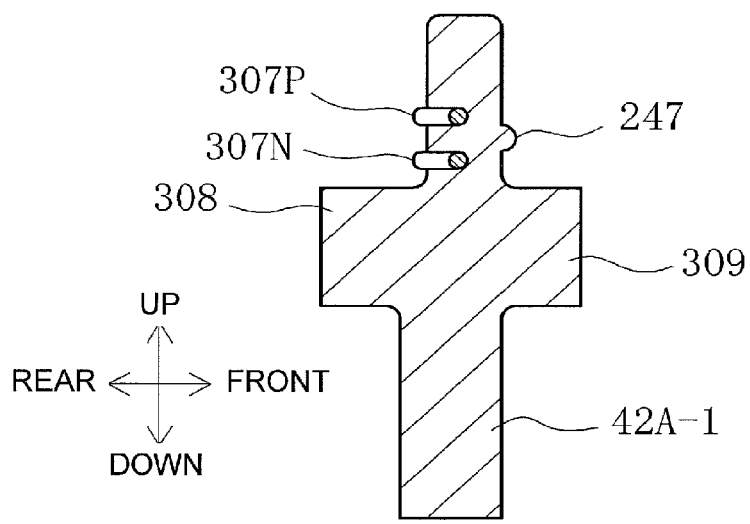
FIG. 15 is a cross-sectional view of the temple body taken along a line E-E of FIG. 14.

The temple body 42A-1 includes a pair of sliding contacts 307P and 307N. The sliding contacts 307P and 307N are connected to the conductor members 306P and 306N, respectively. As illustrated in FIG. 15, the sliding contacts 307P and 307N protrude from the right side surface of the temple body 42A-1. The sliding contacts 307P and 307N can be in contact with the circular arc-shaped conductor members 256P and 256N of the leg portion 300, respectively. Like the temple body 42A of the first embodiment illustrated in FIG. 6, the locking protrusion 247 is formed so as to protrude from the left side surface of the temple body 42A-1. The locking protrusion 247 can be fitted into the plurality of recess portions 250 of the leg portion 301.

Two pivot shafts 308 and 309 are formed so as to protrude from the left and right side surfaces of the temple body 42A-1, respectively. The pivot shafts 308 and 309 can be fitted into the pivot holes 302 and 304 of the leg portions 300 and 301, respectively. The pivot shafts 308 and 309 have diameters that are greater than the smallest opening widths of the openings 303 and 305 of the leg portions 300 and 301, respectively. When the pivot shafts 308 and 309 are inserted into the pivot holes 302 and 304, the lower end portions of the leg portions 300 and 301 are elastically deformed and, therefore, the openings 303 and 305 are expanded, respectively. Such elastic deformation of the openings 303 and 305 allows the connection band 240A-1 to be removed from the temple body 42A-1. In addition, the connection band 240A-1 is connected to the temple body 42A-1 in a pivotable manner about the pivot shafts 308 and 309. According to the second embodiment, the second frame 200 is removable from the first frame 10. Therefore, a maintenance or checking operation of electric connection means, such as the power circuit unit 212 of the module casing 210 and the conductor members 245P and 245N, can be easily performed.

Modifications

It should be noted that the present disclosure is not limited to the above-described embodiments. It will be evident that various modifications and changes may be made without departing from the broader spirit and scope of the disclosure.

(1) While the embodiments have been described with reference to a one-eye head mount display having the display 100 mounted on either right or left side of the first frame 10, the present disclosure is applicable to a two-eye head mount display having two displays on both sides of the frame. Alternatively, the above-described embodiments may be applied to a head mount display that allows a single display 100 to be selectively attached on either right or left side thereof.

Figure 16:
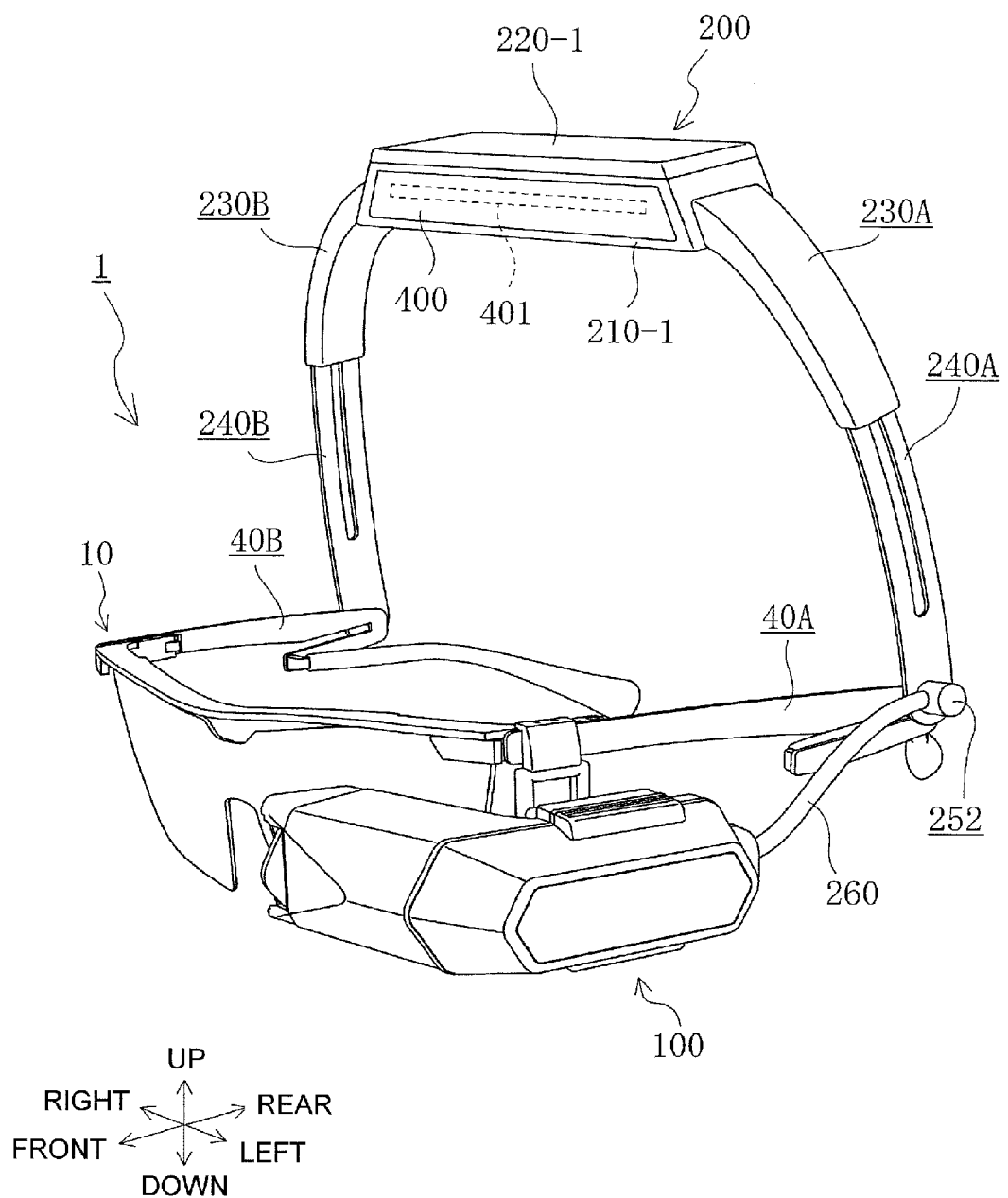
FIG. 16 is a perspective view of a head mount display having a photoelectric conversion panel mounted on the outer peripheral surface of a module casing according to a modification of the first embodiment.

(2) While the embodiments have been described with reference to the batteries BT1 and BT2 replaceably stored in the module casing 210, the module casing 210 may store a generator unit instead of the batteries. For example, as illustrated in FIG. 16, a photoelectric conversion panel 400 may be attached to the outer peripheral surface of a module casing 210-1. In addition, the module casing 210-1 may contain an electric storage device 401 including, for example, a capacitor that accumulates electric power generated by the photoelectric conversion panel 400 using a photovoltaic effect. As another example of a generator unit, a vibro-generator that generates power using electromagnetic induction may be contained in the module casing 210-1. In the modification illustrated in FIG. 16, since a battery is not used, a cover is not needed. However, like the cover 220 of the first embodiment, a cover 220-1 having a decoration pattern may be attached to the module casing 210-1 based on the user's personal preferences.

(3) While the embodiments have been described with reference to a pair of the temple bodies 42A and 42B attached to the endpieces 30A and 30B fixed to the front body 20, respectively, the temple bodies may be directly fixed to the right and left ends of the front body. In such a structure, an attachment member (e.g., the attachment member 60) to which a display is attached may be fixed to the temple body, and the display may be removably attached to the attachment member.

(4) While the first embodiment has been described with reference to the fixing member 252 connected to the display 100 using the connection line 260 separated from the first frame 10, a conductor member that electrically connects a fixing member to a display may be embedded in the temple body.

(5) While the embodiments have been described with reference to the second frame 200 that is extendable in accordance with the length of the upper end portion of the connection band 240A inserted into the internal space of the aim 230A, the connection band may be elastically deformed. In addition, conductor members corresponding to the conductor members 245P and 245N may be extended in the form of a retractable cord.

(6) While the embodiments have been described with reference to the module casing 210 that stores only the power circuit unit 212 for supplying the operating voltage, the module casing may include a control circuit unit that controls an image displayed on the display. In such a configuration, in addition to a conductor member that supplies the operating voltage, the arm and the connection band have a conductor member that supplies an image control signal or light supply means, such as an optical fiber that supplies image light, disposed therein.

(7) While the embodiments have been described with reference to the first frame 10 of an eyeglass type as an example, the first frame 10 may have another form, since the characteristic of the present disclosure is represented by the second frame 200. For example, the first frame may be in the form of a so-called backhand headphone including a pair of mountable portions to be put on the ears of the user and a connection portion that extends along the back of the user's head and that connects the mountable portions to each other.

What is claimed is:

1. A head mount display comprising:
a first frame comprising left and right temples each having inner and outer sides;
a display mounted on the first frame;
a second frame configured to be pivotably connected to the first frame at the respective outer sides of the left and right temples, and comprising a circuit module, the circuit module including a power circuit configured to supply power to the display; and
a first junction configured to electrically connect the display and the circuit module, wherein the first junction comprises: a conductor disposed in one of the first frame and the second frame; and a slidable contact disposed in the other of the first frame and the second frame, wherein the slidable contact is configured to slide on the conductor when in contact,
wherein the second frame further comprises a first support portion supporting a first end portion of the circuit module; and a first pivotable connection portion configured to be pivotably connected to a mountable portion on the first frame on a first end and coupled to the first support portion on a second end, wherein the second frame is configured to change a size of the second frame by changing a relative position of the first support portion and the first pivotable connection portion,
wherein the head mount display further comprises a second junction disposed between the first support portion and the first pivotable connection portion, and
wherein the second junction comprises a further conductor disposed in one of the first support portion and the first pivotable connection portion; and a further slidable contact disposed in the other of the first support portion and the first pivotable connection portion, wherein the further conductor and the further slidable contact are configured to slide relative to each other.

2. The head mount display according to claim 1, wherein the second frame is configured to pivot around a rotation axis, and the first junction is configured to be disposed near the rotation axis.

3. The head mount display according to claim 1, wherein the second frame is configured to pivot between a first position and a second position, the first position has a first angle with respect to the first frame, the second position has a second angle with respect to the first frame, and the first angle is different from the second angle.

4. The head mount display according to claim 3, wherein the first position is disposed in front of a head of a user when the first frame is mounted on the user, and the second position is disposed behind the head of the user when the first frame is mounted on the user.

5. The head mount display according to claim 1, wherein the power circuit is configured to connect to a battery, and the circuit module having a compartment configured to detachably store the battery.

6. The head mount display according to claim 1, wherein the circuit module further comprises: a module case configured to be mounted on the second frame; and a cover configured to be detachably attached to the module case.

7. The head mount display according to claim 1, further comprising an attachment mechanism configured to detachably attach the second frame to a pair of mountable portions on the first frame, the attachment mechanism being disposed between the second frame and the pair of mountable portions.

8. The head mount display according to claim 1, further comprising a switch configured to switch power to the display from the power circuit based on an angle between the first frame and the second frame.

9. The head mount display according to claim 1, wherein the circuit module comprises: a photoelectric converter configured to convert received light into power; and a capacitor configured to charge power from the photoelectric converter.

10. The head mount display according to claim 1, wherein the first frame comprises: a pair of mountable portions; a connection portion connecting the pair of mountable portions; and a front portion extending in a first direction along an axis extending between the pair of the mountable portions, wherein the pair of mountable portions are a pair of temples connected to edge portion of the front portion in the first direction, the pair of temples extend in a second direction crossing the first direction.

11. The head mount display according to claim 10, wherein the pair of mountable portions are disposed on left side and right side ears of a user when the first frame is mounted on the user.

12. The head mount display according to claim 1, wherein the further conductor comprises a plurality of slotted edge portions configured to engage the further slidable contact, wherein a point of contact between the further conductor and the further slidable contact is one of the plurality of slotted edge portions, wherein when the size of the second frame is changed, a point of contact between the further conductor and the further slidable contact changes to a different one of the plurality of slotted edge portions.

13. The head mount display according to claim 1, further comprising a lead line coupled to the further slidable contact on one end and the power circuit on the other.

* * * * *